Patented Jan. 19, 1954

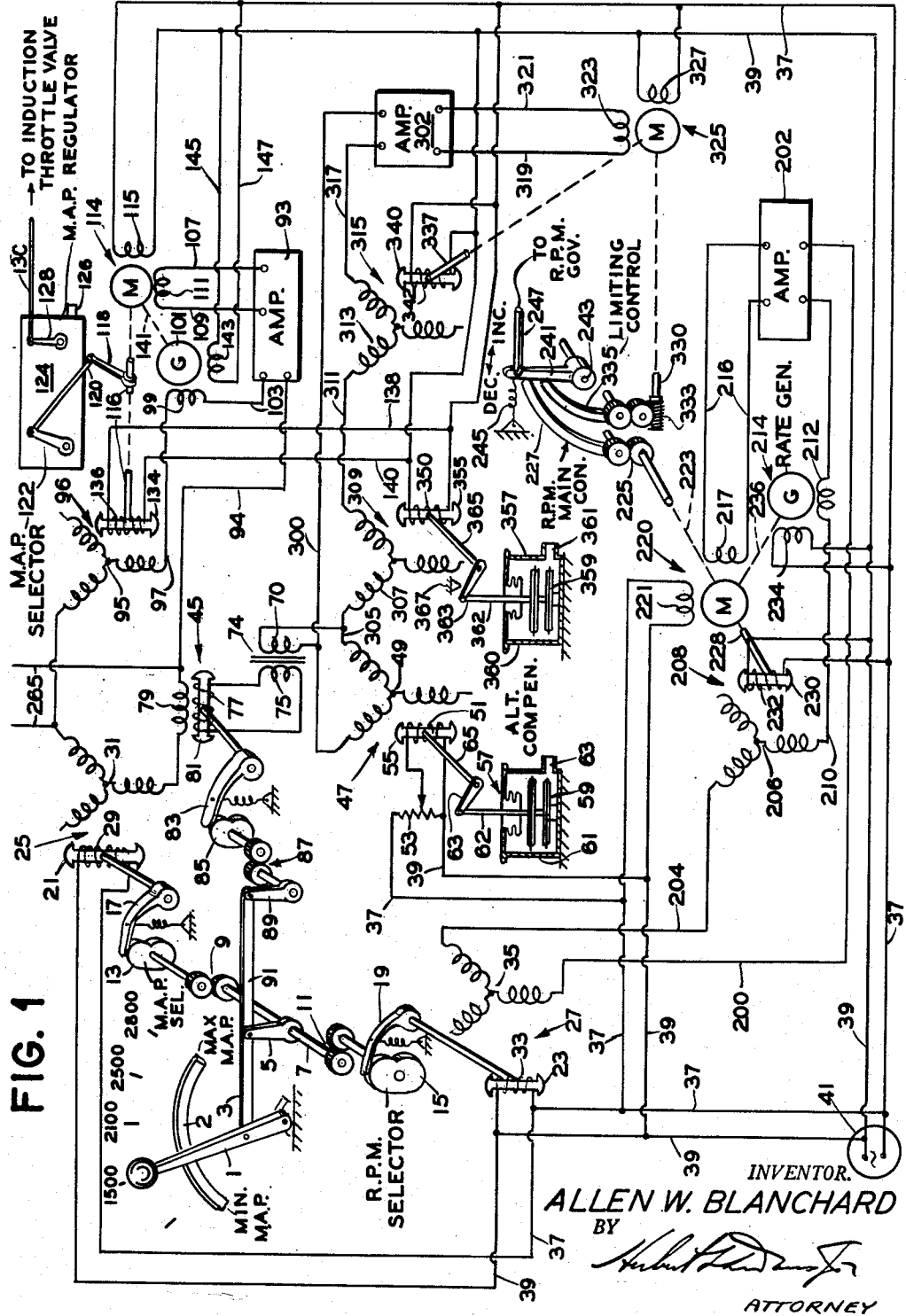

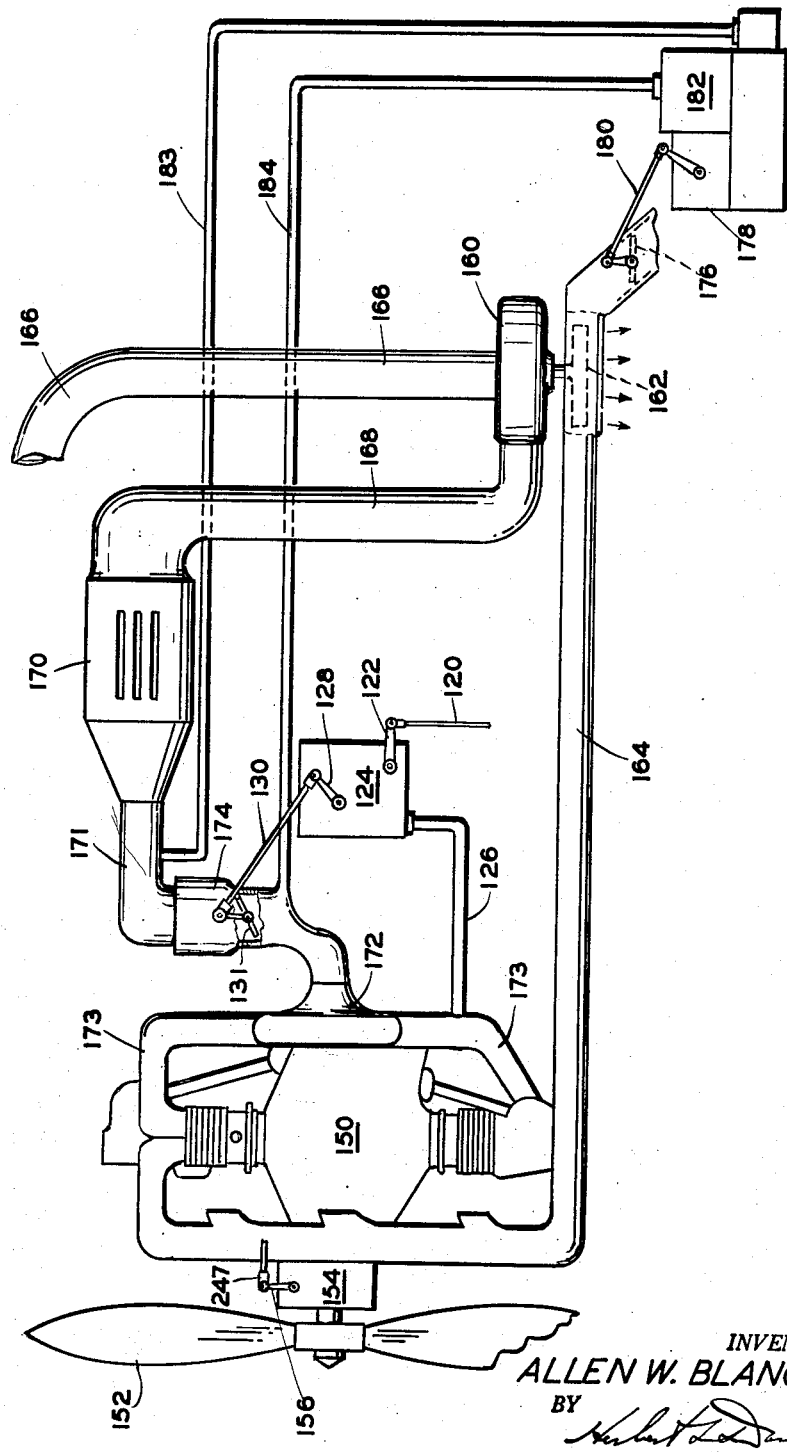

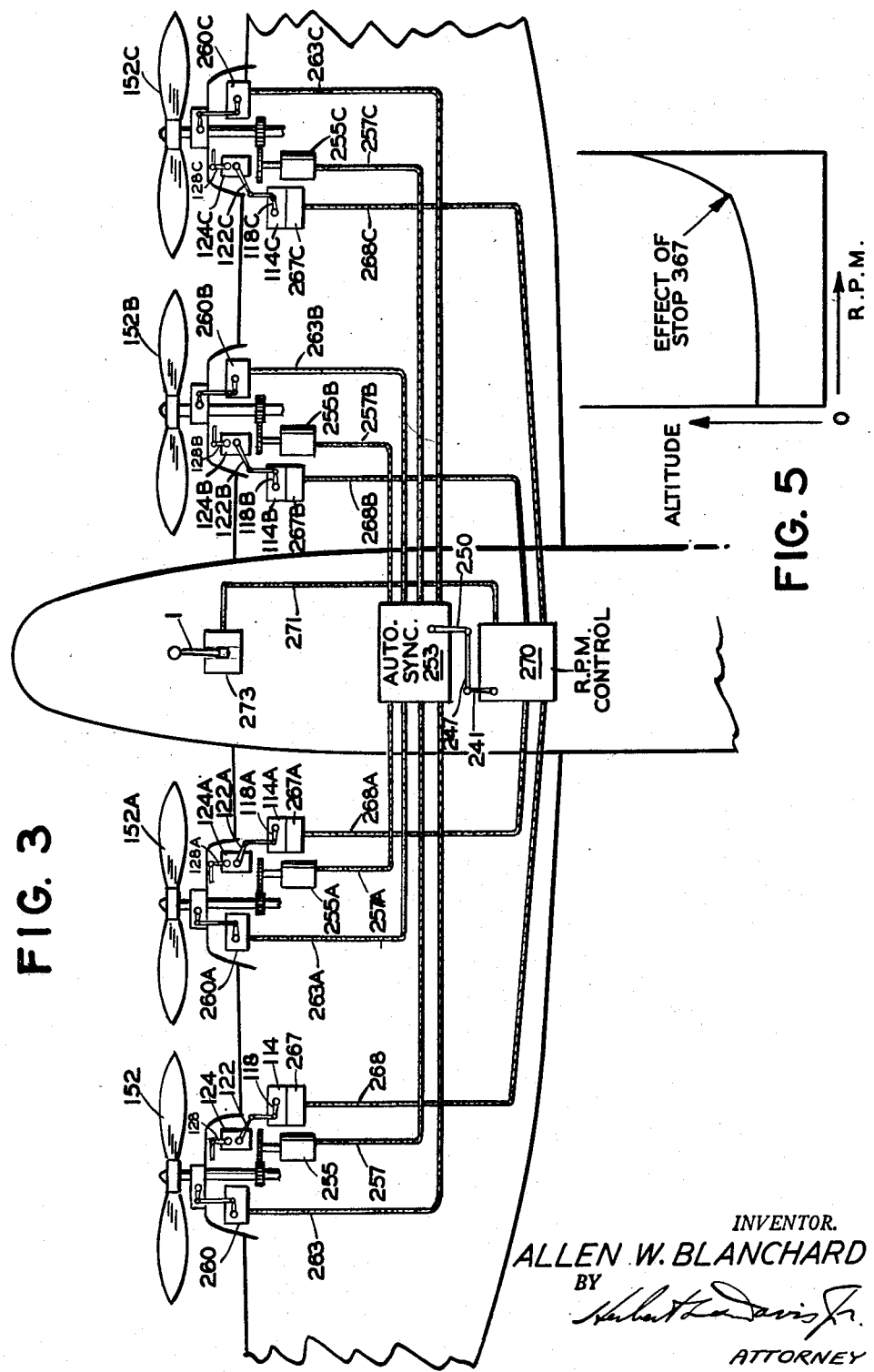

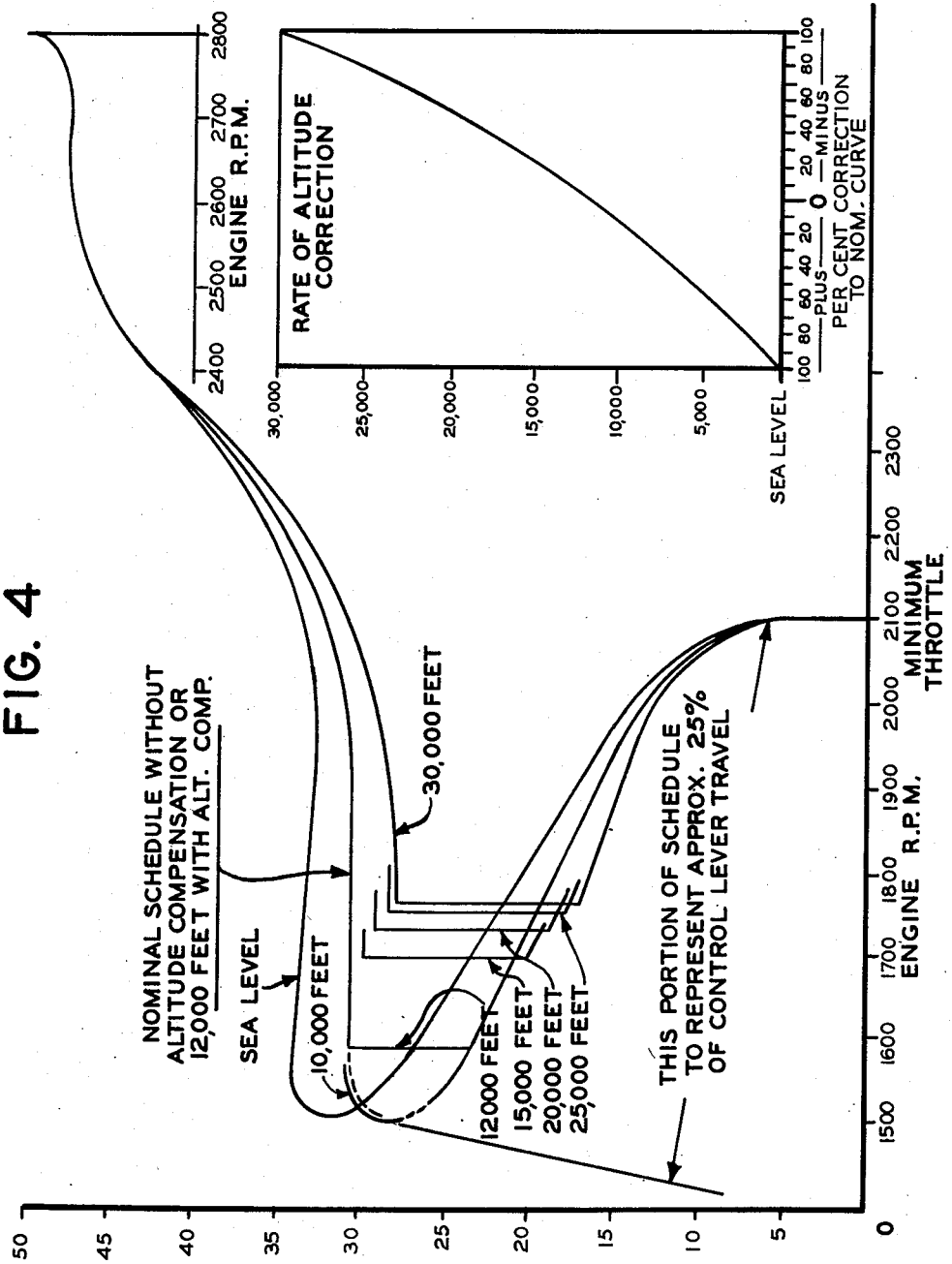

2,666,489

UNITED STATES PATENT OFFICE 2,666,489

ALTITUDE COMPENSATED CONTROL SYSTEM AND APPARATUS FOR AIRCRAFT ENGINES

Allen W. Blanchard, Allendale, N. J., assignor to Bendix Aviation Corporation, Teterboro, N. J., a corporation of Delaware Application August 2, 1951, Serial No. 239,971

7 Claims. (Cl. 170—135.74)

1

The present invention relates to improvement in control systems and apparatus for the power units of aircraft of the type disclosed and claimed in the copending U. S. patent application Serial No. 561,083 filed October 30, 1944 by Joel D. Peterson and assigned to Bendix Aviation Corporation, and more particularly to an Automatic Engine Control System with altitude compensation to control the power output of a single or multi-engine aircraft over a predetermined schedule so as to adjust the power schedule with changes in altitude or the prevailing atmospheric pressure.

An object of the invention is to provide an aircraft engine control system including an engine R. P. M. control system, an engine intake manifold air pressure (M. A. P.) control system, and a turbosupercharger control system; and a system in which the R. P. M. and M. A. P. control systems are coordinated over a predetermined power schedule by a power selection transmitter operated from a single pilot's control lever.

Another object of the invention is to provide a control system in which the power selection transmitter provides a control signal for operating a governor which in turn selects the speed setting of an automatic synchronizer or power governor for maintaining the speed of the engine or engines of the aircraft at a selected value; and in which the power selection transmitter provides a control signal for operating a governor servo which in turn selects the intake manifold pressure setting of a pressure regulator arranged so as to regulate a throttle valve in the intake manifold of the engine or engines of the aircraft for maintaining such intake manifold pressure at the selected value; and in which control system there is further provided an altitude compensator which supplies trim signals to adjust the M. A. P. and R. P. M. setting of the respective speed governor and pressure regulator or regulators according to the prevailing atmospheric pressure or altitude.

Another object of the invention is to provide a control system for an aircraft engine having a turbosupercharger driven by the exhaust gases from the engine for maintaining a constant head of air pressure on the engine carburetor and including in the control system means for limiting the minimum selected R. P. M. to predetermined values variable with the prevailing atmospheric pressure so as to prevent instability of control of the turbosupercharger, and including further means for varying the selected intake manifold pressure with changes in altitude so as

2 to maintain engine efficiency at a given selected R. P. M. with variations in the prevailing atmospheric pressure.

It has been found that in the control of a turbosupercharger driven by the exhaust gases from an aircraft engine that if the speed of the engine is decreased below a predetermined value the control of the turbosupercharger becomes increasingly unstable with decrease in atmospheric pressure, and therefore in order to avoid such instability of control an object of the present invention is to provide altitude compensating means for increasingly limiting the minimum selected R. P. M. with decrease in the prevailing atmospheric pressure so as to prevent the control of the turbosupercharger from going into the aforenoted unstable range or surging at high altitudes and low selected R. P. M.

Moreover, another object of the invention is to provide novel means to decrease the selected intake manifold pressure with increase in altitude of the aircraft so as to maintain high engine efficiency at a given selected R. P. M., so that the M. A. P. for the selected R. P. M. may be made to correspond with a predetermined value for efficient operation of the particular engine or engines under control at the prevailing atmospheric pressure.

The above and other objects and features of the invention will appear more fully hereinafter from a consideration of the following description taken in connection with the accompanying drawings wherein several embodiments of the invention are illustrated by way of example.

Figure 1 is a diagrammatic illustration of the control system.

Figure 2 is a schematic view of an engine system which may be controlled by the system of Figure 1.

Figure 3 is a fragmentary plan view of a multi-engine aircraft illustrating diagrammatically the relative positions of the several operating parts and conduits carrying the electrical connections of the control system of Figure 1.

Figure 4 is a graph illustrating a typical power schedule which may be maintained by the automatic power control system of Figure 1, and Figure 5 is a further graph illustrating the operation of the altitude compensator shown schematically in Figure 1 on the selected R. P. M.

*Power selection*

Referring in detail to the electrical control system of Figure 1, there is provided a single control lever 1 which is adjustably positioned along a quadrant 2 and connected by linkage 3, arm 5, shaft 7 and gearing 9 and 11, respectively, to cams 13 and 15. The profile of the cams 13 and 15 are designed to position cam followers 17 and 19, respectively, so as to position rotor elements 21 and 23 of induction transformers 25 and 27 so as to translate a predetermined power schedule, such as shown in Figure 4, into electrical signals proportional to the schedule.

Figure 4 depicts a typical power schedule which may be followed by the system. As shown in Figure 4, the curve indicated by the notation "Nominal Schedule" represents the operating curve which may be followed by the control system without altitude compensation and is the curve that the power transmitter may translate into electrical signals at for example 12,000 feet. In such a control system the cam 13, follower 17 and transformer 25 control the M. A. P. control system, while the cam 15, follower 19 and induction transformer 27 controls the R. P. M. control system. The cam contour of each cam 13 and 15 is cut to rotate the rotor elements 21 and 23 of the induction transformers 25 and 27 to the positions which correspond to signal positions for the predetermined power schedule which schedule of course is determined in part by the operating characteristics of the engine or engines to be controlled.

The rotor element 21 has a winding 29 thereon inductively coupled to a stator winding 31 of the induction transformer 25, while the rotor element 23 has a winding 33 thereon inductively coupled to a stator winding 35 of the induction transformer 27. Both the rotor winding 29 and the rotor winding 33 are connected across conductors 37 and 39 leading from a suitable source 41 of constant frequency alternating current indicated. Thus the M. A. P. induction transformer 25 and the R. P. M. induction transformer 27 induces in the stator windings 31 and 35, respectively, electrical signals which correspond to the nominal curve of a predetermined power schedule, illustrated for example by the graph of Figure 4.

*Altitude compensator*

A novel feature of the present invention is an altitude compensator which is designed to modify the predetermined nominal power schedule with changes in the prevailing atmospheric pressure. This modication of the nominal power schedule affects both the M. A. P. and R. P. M. control systems. The altitude compensator transmits a voltage to the M. A. P. control system for adding to or subtracting from the electrical signal transmitted by the power transmitter so as to increase the M. A. P. setting upon an increase in the prevailing atmospheric pressure and decrease the M. A. P. setting upon a decrease in such atmospheric pressure. The altitude compensator also applies a control signal to a minimum R. P. M. stop or limiting means which places a minimum limit on the selected R. P. M. This limit increases with the altitude of the aircraft or decrease in the prevailing atmospheric pressure. Thus, as illustrated, for example, by Figure 4, the minimum limit at 12,000 feet may be slightly less than 1600 R. P. M. while at 30,000 feet it may be about 1760 R. P. M.

*M. A. P. altitude compensator*

In affecting the M. A. P. control system, the compensator includes two induction transformers 45 and 47, respectively, which serve to make the aforenoted modication to the M. A. P. setting of the predetermined power schedule curve. The induction transformer 47 has a stator winding 49 and a rotor winding 51 inductively coupled thereto. The rotor winding 51 is connected through a calibrating resistor 53 across the lines 37 and 39 leading to the source of constant frequency alternating current 41. The winding 51 is wound upon a rotor element 55 which is adjustably positioned by an ambient atmospheric pressure responsive mechanism 57, including two sealed evacuated bellows 59, positioned in a casing 61 open by a conduit 63 to the prevailing ambient atmospheric pressure. The bellows 59 adjustably positions the rotor 55 through a rod 62, arm 63 and shaft 65. Thus, the winding 51 induces into the stator winding 49 of the induction transformer 47 a signal which is proportional to the prevailing atmospheric pressure or altitude of the aircraft. This signal is applied to a primary winding 73 of a transformer 74 connected across the stator winding 49 and inductively coupled to a secondary winding 75 of the transformer 74. The secondary winding 75 is in turn connected across a rotor winding 77 of induction transformer 45.

The winding 77 is inductively coupled to a stator winding 79 of the induction transformer 45 and the winding 79 is connected in series with the M. A. P. signal induced in the stator winding 31 of the induction transformer 25. The rotor winding 77 is wound on a rotor element 81 adjustably positioned by cam follower 83 bearing upon a cam element 85 which is adjustably positioned through gearing 87, arm 89 and linkage 91 by the main control lever 1.

The contour of the cam 85 is such that when the input lever 1 is at a predetermined position, 1500 R. P. M., 28" M. A. P. on the power schedule of Figure 4, the coupling relation between the rotor winding 77 and the stator winding 79 is at a maximum. Thus, at such predetermined position of the main control lever 1 any modifying voltage from the pressure sensing induction transformer 47 is at a maximum and is of a voltage sufficient to make the necessary correction in the M. A. P. setting for the atmospheric pressure prevailing at the altitude of the aircraft. The atmospheric pressure sensing induction transformer 47 is so adjusted that it supplies a null signal voltage at a predetermined pressure altitude, of for example 12,000 feet, as shown in the graph of Figure 4.

Hence, at this altitude the power schedule is equal to the "Nominal Power" schedule. If the altitude is decreased, the atmospheric pressure sensing induction transformer 47 will produce a voltage that will make the M. A. P. setting increase and conversely as the altitude is increased the induction transformer 47 will produce a voltage to reduce the M. A. P. setting. Thus, as shown for example by Figure 4, at the 1500 R. P. M. 28" point of the graph, the correction is approximately plus 4" of mercury at sea level and minus 4" of mercury at 30,000 feet. The power schedule of Figure 4 shows that the M. A. P. altitude compensation is maximum at 1500 R. P. M. 28" and decreases to zero at the upper end of the 2400 R. P. M. 42.5" point and at the lower end at 2100 R. P. M. 8" point.

This reduction in compensation correction is accomplished by the cam 85 operating induction transformer 45, which transformer has a maximum coupling at a predetermined adjusted position of the control lever 1, such as the 1500 R. P. M. 28" point of Figure 4 or one-quarter adjusted position of the main control lever 1, shown in Figure 1. The cam 85 rotatably adjusts the rotor winding 77 of the induction transformer 45 so as to decrease the amount of correction as the lever 1 is moved from the one-quarter position in either an M. A. P. increasing or decreasing direction.

When the lever 1 reaches a predetermined M. A. P. increase position, such as the 2400 R. P. M. 42.5" M. A. P. point of Figure 4, the cam 85 operated rotor winding 77 of the induction transformer 45 has turned 90° and has reached a null coupling position relative to the stator winding 79. Further movement of the lever 1 to the maximum M. A. P. position will rotate the cam 85, but as the cam contour at this point has a zero rise the rotor winding 77 of the induction transformer 45 remains at a null coupling position and no correction is added to the M. A. P. signal. Similarly, when the lever 1 is adjusted from the one-quarter position to a predetermined M. A. P. decrease position, such as the 2100 R. P. M. 8" M. A. P. position of Figure 4, the cam 85 operated rotor winding 77 is positioned to a like null coupling position.

As shown in Figure 1, one end of the stator winding 31 of induction transformer 25 is connected to the input of an electronic amplifier 93 through conductor 94 and the secondary winding 79 of the transformer 45 and thus the input to the amplifier 93 is subject to the correction signal aforenoted from the altitude compensator. The other end of the stator winding 31 of induction transformer 25 is connected to one end of a stator winding 95 of an induction transformer 96. The opposite end of the winding 95 is connected by a conductor 97 through winding 99 of a rate generator 101 and through a conductor 103 to the input of the amplifier 93.

Amplifier 93 may be of any suitable type of electronic torque amplifier well known in the art or may be an amplifier of the type such as shown in U. S. Patent No. 2,493,605 granted January 3, 1950 to Adolph Warsher and assigned to Bendix Aviation Corporation.

Electrical conductors 107 and 109 lead from the output of the amplifier 93 to a control winding 111 of a two phase reversible servomotor 114 of conventional type and having a main winding 115 connected across the lines 37 and 39 leading from the source 41 of constant frequency alternating current.

The motor 114 is operatively connected through a shaft 116, arm 118 and link 120 to an arm 122 for varying the pressure setting of an intake manifold pressure regulator 124. The pressure regulator 124 may be of a conventional type or of a type disclosed and claimed in U. S. Patent No. 2,508,229 granted May 16, 1950 to C. E. Cole and assigned to Bendix Aviation Corporation.

The regulator 124 senses intake manifold pressure through a conduit 126, as shown schematically in Figure 2, and is arranged to position through arm 128 and link 130 a carburetor throttle valve 131 so as to maintain the intake manifold pressure at a value selected by the positioning of the lever 122, as explained in the aforenoted Patent No. 2,508,229.

The motor 114, as shown schematically in Figure 1, is also arranged to position through the shaft 116 a rotor element 134 of the induction transformer 96. The rotor element 134 has wound thereon a winding 136 inductively coupled to the stator winding 95 and connected through lines 138 and 140 across the lines 37 and 39 leading to the source 41 of constant frequency alternating current.

The voltage induced into the stator winding 95 of induction transformer 96 by the rotor winding 136 has an opposite phase relation to that induced in the stator winding 31 by the rotor winding 29 of the induction transformer 25 so that the one tends to balance the voltage induced in the other plus the altitude compensating voltage induced in the stator winding 79 of the induction transformer 45, as heretofore explained.

In addition to driving the shaft 116 the servomotor 114 also drives through a shaft 141 the rotor of a rate generator 101 of a conventional type. The rate generator 101 has in addition to winding 99 a second winding 143 connected by lines 145 and 147 across the lines 37 and 39 leading from the main source 41 of alternating current. The rate generator 101 also has its rotor driven through shaft 141 by the servomotor 114 at a speed proportional to that of the motor 114.

The output from the rate generator 101 is applied across the winding 99 and has a frequency determined by the main source 41 connected across winding 143 and the output voltage is proportional to the speed of rotation of the servomotor 114. The rate generator 101 is arranged to induce a feed back voltage having a phase relation acting in opposition to that of the resulting signal voltage from the induction transformers 25, 45 and 96 so as to prevent over-adjustment of the pressure selector lever 122 by the servomotor 114, thus giving stability of control to the system.

*Manifold pressure regulator and turbosupercharger*

A schematic view of a typical engine control system, with which the control system of Figure 1 is designed for use is illustrated in Figure 2, including engine 150, a variable pitch propeller 152 adjusted through a suitable propeller pitch governor control of conventional type and indicated generally by numeral 154 and adjusted through an arm 156, as hereinafter explained. There is further provided an auxiliary supercharger 160 driven by suitable driving means, shown diagrammatically in Figure 2, as a turbine 162 driven by exhaust gas from the engine 150 through an exhaust conduit 164.

The auxiliary supercharger 160 has an air inlet conduit 166 which may be connected to an air scoop in the conventional manner.

There is further provided an air pressure conduit 168 leading from the outlet of the auxiliary supercharger 160 through an intercooler 170 and an air conduit 171 from the intercooler 170 to the inlet of a main supercharger 172 driven by the crank shaft of the engine 150. A carburetor 174 is provided in the air conduit 171 in the conventional manner. An air intake manifold 173 leads from the outlet of the main supercharger 172 to the fuel-air intake of the engine 150.

The speed of rotation of the supercharger 160 and turbine 162 is controlled by a waste gate 176 in a manner well known in the art. Any other suitable driving means for the supercharger 160 may be provided instead of the turbine 162, such as an auxiliary variable speed motor means of any suitable type.

In the instant case the waste gate 176 is adjustably positioned by a servomotor 178 through a rod 180. The motor 178 is in turn controlled by a differential pressure regulator 182 which may be of a conventional type and which senses the pressure drop across the throttle valve 131 through lines 183 and 184, respectively, leading from opposite sides of the throttle valve 131 to the differential pressure sensing device or regulator 182 to control the motor 178 so as to maintain a difference between the carburetor-inlet and carburetor-outlet pressure in excess of a predetermined value.

In the system of Figure 2, the intake manifold pressure in conduit 173 is regulated by the throttle valve 131 adjustably positioned by the pressure regulator 124 which senses intake manifold pressure changes through the conduit 126 and opens or closes the throttle valve 131 so as to maintain the intake manifold pressure at the value determined by the adjustment of the selector lever 122. At high altitudes, under circumstances where the intake manifold pressure selected through operation of the lever 1 is higher than that obtainable with the throttle valve 131 fully open, it is necessary to increase the carburetor inlet pressure above atmospheric pressure. This is obtained through suitable adjustment of the speed of the turbosupercharger 160 by varying the position of the waste gate 176 through the operation of the differential pressure sensing regulator 182. The differential pressure regulator 182 is set so as to maintain a difference between the carburetor-inlet and carburetor-outlet pressures slightly greater than that existing at fully open throttle at maximum power. Thus, the speed of the turbosupercharger is so regulated that the supercharger is supplying sufficient carburetor-inlet pressure to keep the manifold pressure regulator 124 within working range.

The exhaust gases from the engine 150 pass through the exhaust manifold 164 to the turbine 162 where part of the gases go through the turbine 162. This causes the turbine to rotate and in turn drive the supercharger 160. The remaining gases are by-passed to the atmosphere through the waste gate 176.

Air is picked up by the ram air intake 166 and passed to the vanes of the impeller of the supercharger 160 which is driven by the turbine 162. The impeller of the auxiliary supercharger 160 compresses the air and delivers it through the intercooler 170 to the carburetor 174 where it is mixed with fuel. The air is then directed into the main engine driven supercharger 172 where it is further compressed and fed to the cylinders of the engine 150. As the altitude changes and the pressure on the vanes of the impeller of the supercharger 160 increases or decreases, it becomes necessary to decrease or increase the speed of the auxiliary supercharger 160 to maintain the carburetor inlet pressure. This is done by moving the waste gate 176 thus changing the amount of exhaust gas driving the turbine 162.

The primary function of the differential turbosupercharger regulator 182 is to open or close the waste gate 176 automatically so as to vary the speed of the supercharger 160 so as to hold the carburetor inlet pressure constant regardless of changes in atmospheric pressure, when a constant manifold pressure throttle valve setting is made, and thus to supply sufficient carburetor inlet pressure to keep the manifold pressure regulator 124 within working range.

R. P. M. selector control

As heretofore explained, the signal that controls the selected engine R. P. M. originates in the power transmitter control lever 1 through its adjustment of the rotor winding 33 of the induction transformer 27. The R. P. M. induction transformer 27 transmits an electrical signal that has a certain relationship to the position of the power lever 1 and follows a predetermined schedule, as illustrated graphically by Figure 4. Therefore, this electrical signal represents the definite value of R. P. M. as determined by the position of the control lever 1. The output of the stator winding 35 of the induction transformer 27 is connected through conductor 200 to the input of a suitable electronic torque amplifier 202 which may be of a conventional type or of a type such as shown in U. S. Patent No. 2,493,605 granted January 3, 1950 to Adolph Warsher and assigned to Bendix Aviation Corporation. The other output of the stator winding 35 of induction transformer 27 is connected through a conductor 204 to the stator winding 206 of a second induction transformer 208. The opposite end of the stator winding 206 is connected through a conductor 210 and an output winding 212 of a rate generator 214 to the other input of the amplifier 202. The output of amplifier 202 is connected through conductors 216 to a control winding 217 of a two phase reversible servomotor 220 having another winding 221 connected across the main source 41 of alternating current through conductors 37 and 39.

As indicated diagrammatically in Figure 1, the servomotor 220 is operatively connected through a shaft 223 and gearing 225 to a main R. P. M. control member 227 and also through shaft 228 to a rotary element 230 of induction transformer 208. The rotary element 230 has wound thereon a winding 232 connected through conductors 37 and 39 to the main source 41 of alternating current. The winding 232 induces into the stator winding 206 of the induction transformer 208 a voltage having an opposite phase relationship to that induced in stator winding 35 of the induction transformer 27 so that the voltage induced in the one tends to counter-balance the voltage induced in the other and in normal balanced relationship, there is no signal or error voltage applied to the amplifier 202 through the input lines 200 and 210.

If, however, the governor servo induction transformer 208 is not in balanced relationship with the R. P. M. induction transformer 27 an error signal is developed. This error signal is fed through the amplifier 202 to the control winding 217 and is of such a phase as to cause the rotation of the motor 220 in a direction to reposition the rotor winding 232 of induction transformer 208 so as to vary the induced voltage in the stator winding 206 to rebalance the voltage induced in the stator winding 35 by the rotor winding 33 of induction transformer 27 and wipe out the error or signal voltage, while the motor 220 simultaneously repositions the R. P. M. main control member 227 to a position determined by the adjusted position of the power control lever 1.

In addition to driving shaft 223 the servomotor 220 also drives through a shaft 236 a rotor of the rate generator 214 of conventional type. The rate generator 214 has in addition to the winding 212 a second winding 234 connected to the main source 41 of constant frequency alternating current through the conductor lines 37 and 39. The rotor of the rate generator 214 is driven through the shaft 236 by the servomotor 220 at a speed proportional to the speed of the motor.

The output from the rate generator 214 is applied through the winding 212 and has a frequency determined by the main source 41 connected across the winding 234 and the output voltage is proportional to the speed of rotation of the motor 220. The rate generator 214 is arranged to introduce a feed back voltage in the winding 212 having a phase relation acting in opposition to that of the error signal voltage so as to reduce the error signal voltage with increase in the driven speed of the motor 220 so as to retard the adjustment by the motor 220 of the R. P. M. main control member 227 and thereby prevent over-adjustment of the member 227, thus giving stability of control to the system.

A second member 241 pivoted at 243 is normally biased by a spring 245 in a counter-clockwise direction and into contacting relation with the main control member 227 so that the position of the second member 241 may be adjustably positioned by the motor 220 through the operation of the main control member 227.

The member 241 may be connected, as shown in Figure 2, by a link 247 to a speed setting arm 156 of a suitable propeller pitch governor control 154. The propeller pitch governor control 154 may be of a conventional type or may be of a type such as shown in the copending U. S. application Serial No. 561,083 filed October 30, 1944 by Joel D. Peterson and assigned to Bendix Aviation Corporation, in which the propeller pitch governor 154 controls the pitch of the propeller blades 152 so as to maintain the R. P. M. of the engine at a value determined by the setting of the arm 156. The arm 156 may be adjustably positioned through linkage 247 by the motor 220 and control member 227 to a position corresponding to that selected through adjustment of the cam 15 by the control lever 1.

In an alternative form of the invention for multi-engine control, as shown in Figure 3, the member 241 may adjustably position through linkage 247 a control arm 250 for varying the speed setting of a synchronizer 253 which may be of a conventional type well known in the art and including means for balancing the speed of each engine as sensed by an alternator driven by each engine and indicated in Figure 3 by the numerals 255, 255A, 255B and 255C against the speed of a master motor in the synchronizer 253 the speed of which may be varied by the setting of the control arm 250. The alternators may be electrically connected to the master synchronizer 253 through suitable electrical conduits 257, 257A, 257B and 257C, respectively.

Servomotors 260, 260A, 260B and 260C controlled by the synchronizer 253 through suitable electrical conduits 263, 263A, 263B and 263C, respectively, serve to adjust the pitch of the respective propellers 152, 152A, 152B and 152C controlled thereby so that each engine R. P. M. corresponds to that selected at the synchronizer 253 by the adjustment of the control arm 250.

As shown in Figure 1, electrical connectors 265 and 266 may lead from the M. A. P. induction transmitter 25 to M. A. P. control systems for the respective M. A. P. selector motors 114A, 114B and 114C. Each of such M. A. P. control systems may include an induction transformer, rate generator, and amplifier corresponding to that provided for the motor 114 and indicated in Figure 1 by the numerals 96, 101 and 93.

Such M. A. P. control systems for the motors 114, 114A, 114B and 114C may be housed in control boxes 267, 267A, 267B and 267C operatively connected through electrical conduits 268, 268A, 268B and 268C, as shown in Figure 3, to control box 270 and through a conduit 271 to the M. A. P. induction transmitter 25 which may be housed in a transmitter control box 273.

The control arm 241 is operatively positioned by motor means controlled by the R. P. M. control system, shown schematically in Figure 1, and housed in the control box 270.

The power transmitter control including lever 1, cams 13 and 15 and the induction transformers 25 and 27 is housed in the control box 273 and is operatively connected, as shown in Figure 1, to the R. P. M. control system in box 270 through the electrical conduit 271, shown in Figure 3 and through conduits 268, 268A, 268B and 268C to the M. A. P. control systems in the control boxes 267, 267A, 267B and 267C.

It will be seen from the foregoing, that the R. P. M. signal from the R. P. M. selector induction transformer 27 is matched against the signal from the governor servo operated induction transformer 208, the resulting electrical addition of these two signals is an error signal proportional to the misalignment between the two induction transformers. When the control arm 250 on the synchronizer 253 is in a position to select the R. P. M. called for by the power transmitter lever 1, the signal from the R. P. M. induction transformer 27 is equal to, but of opposite phase to the signal from the governor induction transformer 208 and the resulting error signal is zero indicating that the control arm 250 of the synchronizer 253 is at the proper position to obtain the R. P. M. called for. If the governor induction transformer 208 is not in alignment with the R. P. M. selector induction transformer 27 an error signal is developed. This error signal is then applied through the amplifier 202 to control the servomotor 220 so as to effect rotation thereof in a direction such as to actuate the arm 250 to the correct R. P. M. position and reposition the rotor winding 232 of the induction transformer 208 so as to balance out the error signal. Rotation of the motor 220 also effects through the rate generator 214 a stabilizing signal which is combined with the error signal and fed to the input of the amplifier 202, as heretofore explained.

R. P. M. altitude compensator

The aforedescribed R. P. M. system including the induction transformers 27 and 208 normally effects the R. P. M. called for by the position of the control lever 1 regardless of the prevailing atmospheric pressure or altitude of the aircraft. As previously explained, however, the predetermined power schedule requires that the minimum selected R. P. M. be increased as the prevailing atmospheric pressure decreases with increase in the altitude of the aircraft.

The mechanism for controlling the minimum selected R. P. M. includes the induction transformer 47 having the rotor winding 51 adjustably positioned in inductive relation to the stator winding 49 by the atmospheric pressure responsive mechanism 57, as previously explained. One end of the stator winding 49 is connected through a conductor 300 to the input of an electronic amplifier 302 of a suitable type well known in the art. The opposite end of the stator winding 49 is connected by a conductor 305 with one end of a stator winding 307 of a second induction transformer 309, while the opposite end of the stator winding 307 is connected by a conductor 311 to one end of a stator winding 313 of a third induction transformer 315. The opposite end of the stator winding 313 is connected by a conductor 317 to the input of the amplifier 302.

The amplifier 93 may be of any suitable type of electronic torque amplifier well known in the art or may be an amplifier of the type such as shown in U. S. Patent No. 2,493,605 granted January 3, 1950, to Adolph Warsher and assigned to Bendix Aviation Corporation.

Electrical conductors 319 and 321 lead from the output of the amplifier 302 to a control winding 323 of a two phase reversible servomotor 325 of conventional type and having a main winding 327 connected across the lines 37 and 39 leading from the source 41 of constant frequency alternating current.

The motor 325 is operatively connected through a shaft 330 and gearing 333 to stop member 335 cooperating with member 241 to limit the minimum R. P. M. that may be selected by the adjustment of the main control member 327 upon changes in the prevailing atmospheric pressure, as hereinafter explained. The motor 325 is also operatively connected through a shaft 337 to a rotary element 340 of induction transformer 315. The rotary element 340 has wound thereon a winding 342 inductively coupled to the stator winding 313 and connected across the main source 41 of alternating current through conductors 37 and 39.

Further the induction transformer 309 has a rotor winding 350 inductively coupled to the stator winding 307. The rotor winding 350 is connected across the lines 37 and 39 leading to the source 41 of constant frequency alternating current. The winding 350 is wound upon a rotor element 355 which is adjustably positioned by an ambient atmospheric pressure responsive mechanism 357, including two sealed evacuated bellows 359, positioned in a casing 360 open by a conduit 361 to the prevailing ambient atmospheric pressure. The bellows 359 adjustably positions the rotor 355 through a rod 362, arm 363 and shaft 365. A stop 367 cooperates with arm 363 to limit the adjusted position of the winding 350 in response to decrease in atmospheric pressure reflecting an increase in altitude.

The rotor windings 51 and 350 induce in the stator windings 49 and 307, respectively, voltages of like phase, while the rotor winding 342 induces in the stator winding 313 a voltage of opposite phase and which tends to balance the sum of the voltages induced in the stator windings 49 and 307 by the rotor windings 51 and 350, respectively.

Upon these voltages being in an out of balance relationship, there is applied across the lines 300 and 317 leading to the input of the amplifier 302 an error signal of a phase such as to cause rotation of the motor 325 in a direction to reposition the rotor winding 342 so as to vary the induced voltage in the stator winding 313 of induction transformer 315 to rebalance the control voltages and wipe out the error signal, while the servomotor 325 simultaneously repositions the stop member 335 to a position determined by the prevailing atmospheric pressure, since the transmitted signal from the induction transformers 49 and 309 represents the minimum R. P. M., which may be selected by the main control lever 1 for the prevailing pressure altitude. Where the R. P. M. selected by the main control lever 1 is less than that determined by the prevailing atmospheric pressure, the stop member 335 takes over control of the member 241 and prevents the same under the biasing force of the spring 245 from following the position of the main control member 227. When the R. P. M. selected by the main control lever 1 exceeds the minimum, the main control member 227 controls the position of the member 241.

The curve characteristics of the induction transformers 49 and 309 are matched to give the desired predetermined R. P. M. limiting curve which, for example, follows that shown in Figures 4 and 5. As indicated in Figure 5, since at high altitudes relatively slight change in the minimum R. P. M. is required for relatively large changes in the pressure altitude, the stop 367 is arranged to limit operation of the atmospheric pressure responsive mechanism 357 in response to changes in atmospheric pressures below a predetermined value so that under high altitude pressure conditions, the mechanism 57 solely controls the stop member 335, as indicated graphically by Figure 5.

*Operation*

From the foregoing, it will be seen that there has been provided a novel system for controlling the power output of a single or multi-engine aircraft over a predetermined schedule, such as shown by Figure 4, and in which there is provided three major control systems; the R. P. M. system, the manifold air pressure (M. A. P.) system, and the turbo-supercharger system.

The R. P. M. and M. A. P. systems are coordinated over the power schedule by a power transmitter, including the lever 1 and induction transformers 25 and 27 operatively connected thereto.

The R. P. M. signal from the power transmitter provides the intelligence for operating a governor servomotor 220 which in turn actuates a propeller pitch governor control mechanism indicated by numeral 154 in Figure 2 or engine synchronizer indicated by numeral 253 in Figure 3.

The M. A. P. signal from the power transmitter provides the signal for operating the servomotor 114 for varying the pressure setting of a boost control mechanism 124, as shown in Figures 1, 2 and 3.

A novel feature of the invention is the provision of a pressure altitude compensator which supplies trim signals to adjust the M. A. P. and R. P. M. signals in accordance with the prevailing atmospheric pressure affected by the altitude of the aircraft.

The turbo-supercharger system, shown in Figure 2, serves to maintain a constant head of air pressure on the engine carburetor which is in turn regulated by the boost control mechanism to effect efficient operation of the aircraft engine under varying pressure altitude, and subject of course to a minimum R. P. M. as determined by the altitude compensator.

As indicated graphically in Figure 4, movement of the control lever 1 from the 1500 R. P. M. 28" M. A. P. position to the minimum M. A. P. position effects an increase in the selected R. P. M. to 2100 R. P. M. It will be further noted that within approximately the first quarter range of adjustment of the control lever 1, the selected R. P. M. varies inversely with the selected M. A. P., while over approximately the last three quarter range of adjustment of the control lever 1 the selected R. P. M. varies directly with the selected M. A. P.

The aforenoted arrangement permits in the landing of the aircraft, the adjustment of the control lever 1 within a first quarter range of adjustment so as to select a relatively high R. P. M. setting with minimum M. A. P. permitting in turn the propellers of the aircraft to windmill, i. e., to be driven jointly by the engine and force of the air through which the aircraft is flying and at the relatively high R. P. M. setting, while the engine is operating under a minimum M. A. P. tending thereby to decrease the landing speed of the aircraft and facilitating the landing operation thereof.

This arrangement further provides a propeller pitch setting which will effect emergency power upon rapid increase in manifold pressure by appropriate adjustment of the lever 1 by the pilot without requiring a change in propeller pitch and the subsequent time delay by the propeller pitch control mechanism.

Although only two embodiments of the invention have been illustrated and described, various changes in the form and relative arrangements of the parts may be made to suit requirements.

What is claimed is:

1. For use in controlling the power output of an aircraft engine having an air intake pressure regulator and an engine speed governor; the combination comprising a first actuator motor to vary the pressure setting of the regulator, a master control means, means for operably connecting the master control means to said first actuator motor, atmospheric pressure responsive control means connected to said first actuator motor by said last mentioned connecting means, including first means in said connecting means to effect operation of said first actuator motor from said pressure responsive control means to vary the pressure setting of the regulator with changes in altitude of the aircraft, and second means operably connecting the master control means to said first means to vary the effect of said pressure responsive control means on said first actuator motor, a second actuator motor, means for operably connecting the master control means to said second actuator motor, a third actuator motor, means for operably connecting the pressure responsive control means to said third actuator motor for controlling the third motor with changes in the altitude of the aircraft, a member to be controlled for varying the speed setting of the engine speed governor, and means for operably connecting said second and third actuator motors to said member to adjustably position the same.

2. For use in controlling the power output of an aircraft engine having an air intake pressure regulator and an engine speed governor; the combination comprising an electrically operated first actuator motor to vary the pressure setting of the regulator, a master electrical control, means for operably connecting the master control to said first actuator motor, an atmospheric pressure responsive electrical control connected to said first actuator motor by said last mentioned connecting means, including variable inductive coupling means in said connecting means to effect operation of said first actuator motor from said pressure responsive control to vary the pressure setting of the regulator with changes in altitude of the aircraft, an operative connection between said master control and said variable inductive coupling means to vary the effect of said inductive coupling means and thereby vary the effect of said pressure responsive control means on said first actuator motor, an electrically operated second actuator motor, means for operably connecting the master control to said second actuator motor, an electrically operated third actuator motor, means for operably connecting the pressure responsive control means to said third actuator motor for controlling the third motor with changes in the altitude of the aircraft, a member to be controlled for varying the speed setting of the engine speed governor, a pair of stop members cooperating with the member to be controlled, and means operably connecting said second actuator motor to one of said stop members and the third actuator motor to the other stop member for limiting the adjustment of the controlled member in one sense by one or the other of said stop members.

3. For use with a boost control for an aircraft engine, said boost control having an adjustable member for changing the datum of said boost control; the combination comprising an electrically operated actuator motor to position said datum changing member, a master electrical control, means for operably connecting the master control to said actuator motor, an atmospheric pressure responsive electrical control connected to said actuator motor by said last mentioned connecting means, including variable inductive coupling means in said connecting means to effect operation of said actuator motor by said atmospheric pressure responsive control, cam means operably connecting the master control to said variable inductive coupling means to vary the effect of said inductive coupling means and thereby the effect of said actuator motor on said datum changing member in response to said atmospheric pressure responsive control.

4. For use with a propeller pitch governor for an aircraft engine, said governor having an adjustable member for changing the datum of said governor; the combination comprising an electrically operated first actuator motor, a master electrical control, means for operably connecting the master control to said first actuator motor, a second actuator motor, an atmospheric pressure responsive electrical control, means for operably connecting the atmospheric pressure responsive control to said second actuator motor, a pair of adjustable stop members, spring means for biasing said datum changing member into operative engagement with at least one of said stop members, and means operably connecting said first actuator motor to one of said stop members and the other actuator motor to the other stop member for adjustably positioning the same to limit movement of said datum changing member under the biasing force of said spring means.

5. For use in controlling the power output of an aircraft engine having an intake manifold and a variable pitch propeller driven by the engine, a control for regulating the intake manifold pressure to a selected value, a governor for controlling the pitch of the propeller so as to regulate the engine speed to a selected value, and said control and governor each having an adjustable datum changing member operative respectively to vary the selected intake manifold pressure and speed of the engine; the combination comprising an electrically operated actuator motor for positioning the datum changing member of the intake manifold pressure control, a master electrical control, means for operably connecting the master control to said first actuator motor, an atmospheric pressure responsive electrical control connected to said first actuator motor by said last mentioned connecting means to effect operation of said first actuator motor by said atmospheric pressure responsive control, other means operatively connecting said master control to said last mentioned connecting means to vary the effect of said atmospheric pressure responsive control on said first actuator motor, an electrically operated second actuator motor, means for operably connecting the master control to said second actuator motor, a third actuator motor, means for operably connecting the atmospheric pressure responsive control to said third actuator motor, a pair of adjustable stop members, a control element for adjustably positioning the datum changing member of the propeller pitch governor, spring means for biasing said control element into operative engagement with at least one of said stop members, and means operably connecting said first actuator motor to one of said stop members, and the other actuator motor to the other stop member for adjustably positioning the stop members so as to limit movement of the control element under the biasing force of said spring means in an engine speed decreasing sense.

6. A control device for a supercharged aircraft engine having an air intake manifold and a throttle valve to control the pressure of the air in said intake manifold; said control device comprising in combination a boost control to vary the position of said throttle valve with changes in said intake manifold pressure, a pilot's control mechanism, means for changing the datum of said boost control, means connecting said pilot's control mechanism to said datum changing means for operating said datum changing means from the pilot's control mechanism, atmospheric pressure responsive means, a variable inductive coupling means to operably connect said pressure responsive means to said connecting means to vary the position of said datum changing means relative to that of the pilot's control mechanism with changes in the altitude of the aircraft, and cam means operably connecting the pilot's control mechanism to said inductive coupling means to vary the effect of the pressure responsive means on said datum changing means with adjustment of said pilot's control mechanism.

7. For use with an aircraft engine speed governor having means for varying the speed setting of the governor; the combination comprising a first actuator motor, a master control means, means for operably connecting the master control mean to said first actuator motor, a second actuator motor, atmospheric pressure responsive control means, means for operably connecting the atmospheric pressure responsive control means to said second actuator motor, a control member for adjusting the speed setting means of the engine speed governor, means for biasing said control member in a speed decreasing sense, a pair of stop members adjustably positioned relative one to the other and in and out of operative relation with the control member, and means operably connecting said first actuator motor to one of said stop members and the other actuator motor to the other stop member for positioning one or the other of said stop members into operative relation with said control member so as to limit adjustment of the control member by said biasing means in said speed decreasing sense.

ALLEN W. BLANCHARD.

References Cited in the file of this patent

UNITED STATES PATENTS

| Number | Name | Date |
|---|---|---|
| Re. 22,661 | Gosslau et al. | Aug. 7, 1945 |
| 2,346,916 | Halford et al. | Apr. 18, 1944 |
| 2,384,353 | Stieglitz | Sept. 4, 1945 |
| 2,474,618 | Divoll | June 28, 1949 |
| 2,499,376 | Ferrill, Jr. | Mar. 7, 1950 |
| 2,532,936 | Peterson | Dec. 5, 1950 |
| 2,551,979 | Sparrow | May 8, 1951 |
| 2,555,784 | Catford | June 5, 1951 |

FOREIGN PATENTS

| Number | Country | Date |
|---|---|---|
| 883,676 | France | Mar. 29, 1943 |

OTHER REFERENCES

Ser. No. 281,826, Stieglitz et al. (A. P. C.), published May 18, 1943.